A. L. BINGHAM.
GLASS HANDLING MECHANISM.
APPLICATION FILED DEC. 2, 1907. RENEWED JULY 28, 1909.

1,100,345.

Patented June 16, 1914.
5 SHEETS—SHEET 1.

A. L. BINGHAM.
GLASS HANDLING MECHANISM.
APPLICATION FILED DEC. 2, 1907. RENEWED JULY 28, 1909.

1,100,345.

Patented June 16, 1914.
5 SHEETS—SHEET 2.

Witnesses
Frank A. Fahle
Thomas W. McMeans

Inventor
Alvah L. Bingham
By Bradford Hood
Attorneys

A. L. BINGHAM.
GLASS HANDLING MECHANISM.
APPLICATION FILED DEC. 2, 1907. RENEWED JULY 28, 1909.
1,100,345.
Patented June 16, 1914.
5 SHEETS—SHEET 3.
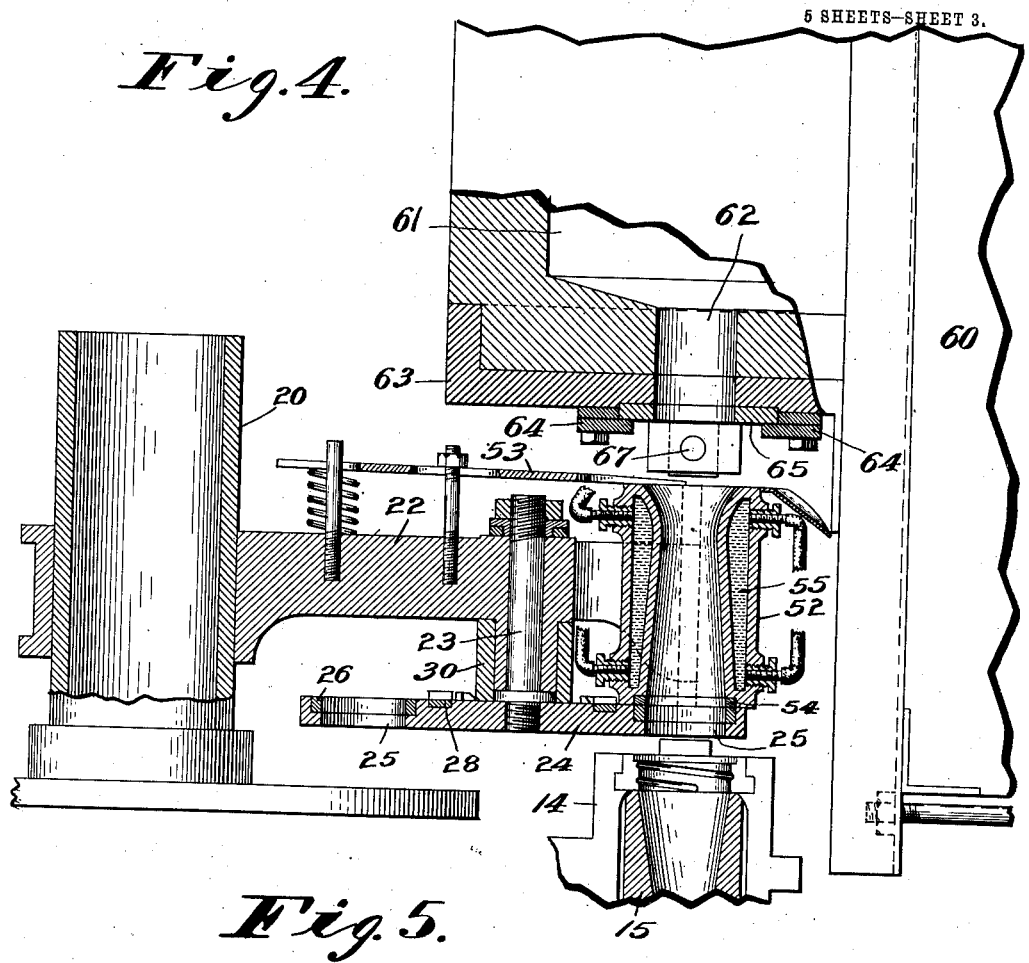
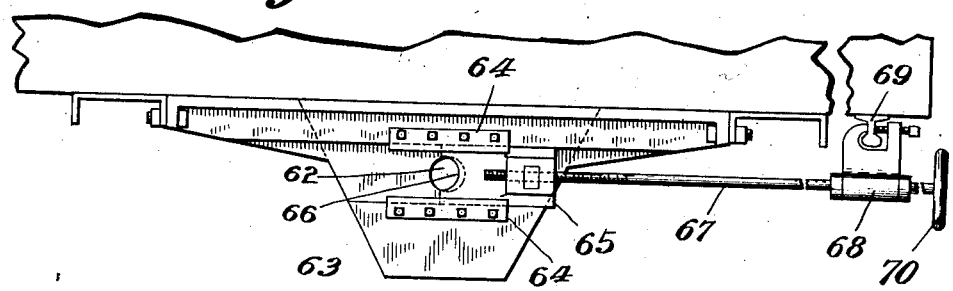
Witnesses
Frank A. Fahle
Thomas W. McMeans
Inventor
Alvah L. Bingham
BY
Bradford Hood
Attorneys A. L. BINGHAM.
GLASS HANDLING MECHANISM.
APPLICATION FILED DEC. 2, 1907. RENEWED JULY 28, 1909.

1,100,345. Patented June 16, 1914.
5 SHEETS—SHEET 4.

Witnesses
Frank A. Fahl
Thomas W. McMeans

Inventor
Alvah L. Bingham
By Bradford Hood.
Attorneys

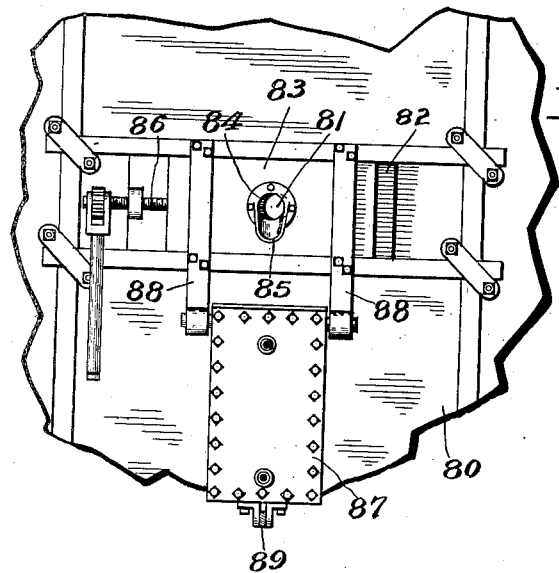
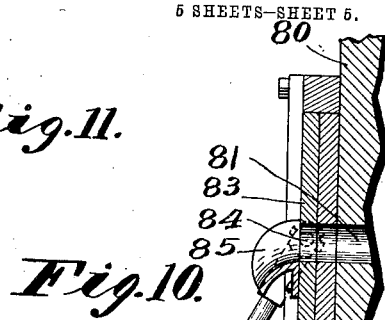
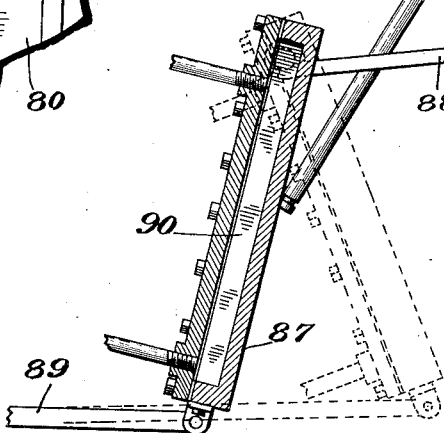
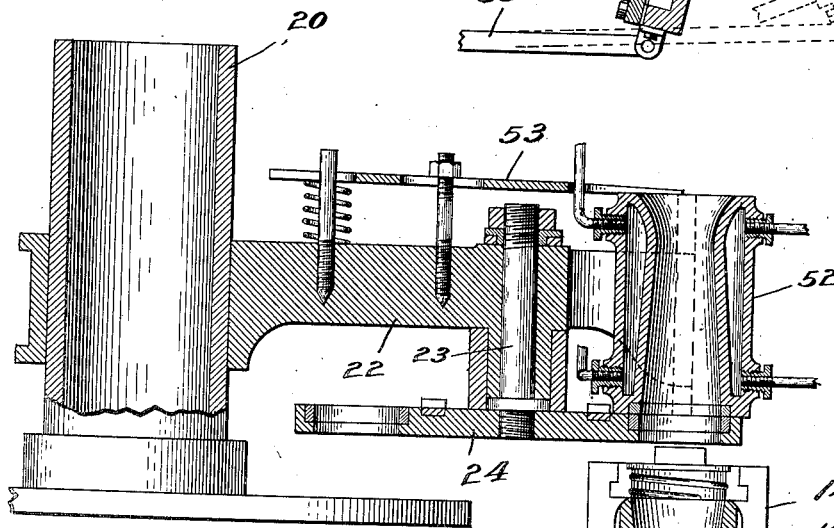

UNITED STATES PATENT OFFICE.

ALVAH L. BINGHAM, OF MUNCIE, INDIANA, ASSIGNOR TO BALL BROTHERS GLASS MANUFACTURING COMPANY, OF MUNCIE, INDIANA, A CORPORATION OF INDIANA.

GLASS-HANDLING MECHANISM.

1,100,345. Specification of Letters Patent. Patented June 16, 1914.

Application filed December 2, 1907, Serial No. 404,760. Renewed July 28, 1909. Serial No. 509,975.

*To all whom it may concern:*

Be it known that I, ALVAH L. BINGHAM, a citizen of the United States, residing at Muncie, in the county of Delaware and State of Indiana, have invented certain new and useful Improvements in Glass-Handling Mechanism, of which the following is a specification.

The object of my invention is to produce a mechanism by means of which a glass-forming machine may be operated in conjunction with a glass furnace or pot in such manner that a continuous stream of molten glass may be permitted to flow from the furnace and that stream at times to flow directly into the mold or other forming device of the machine, an interrupter being provided to intermittently engage the continuously flowing stream and sever it into desired portions, the arrangement being such that the molten metal is not materially cooled in its passage from the furnace to the forming device.

Figure 1:
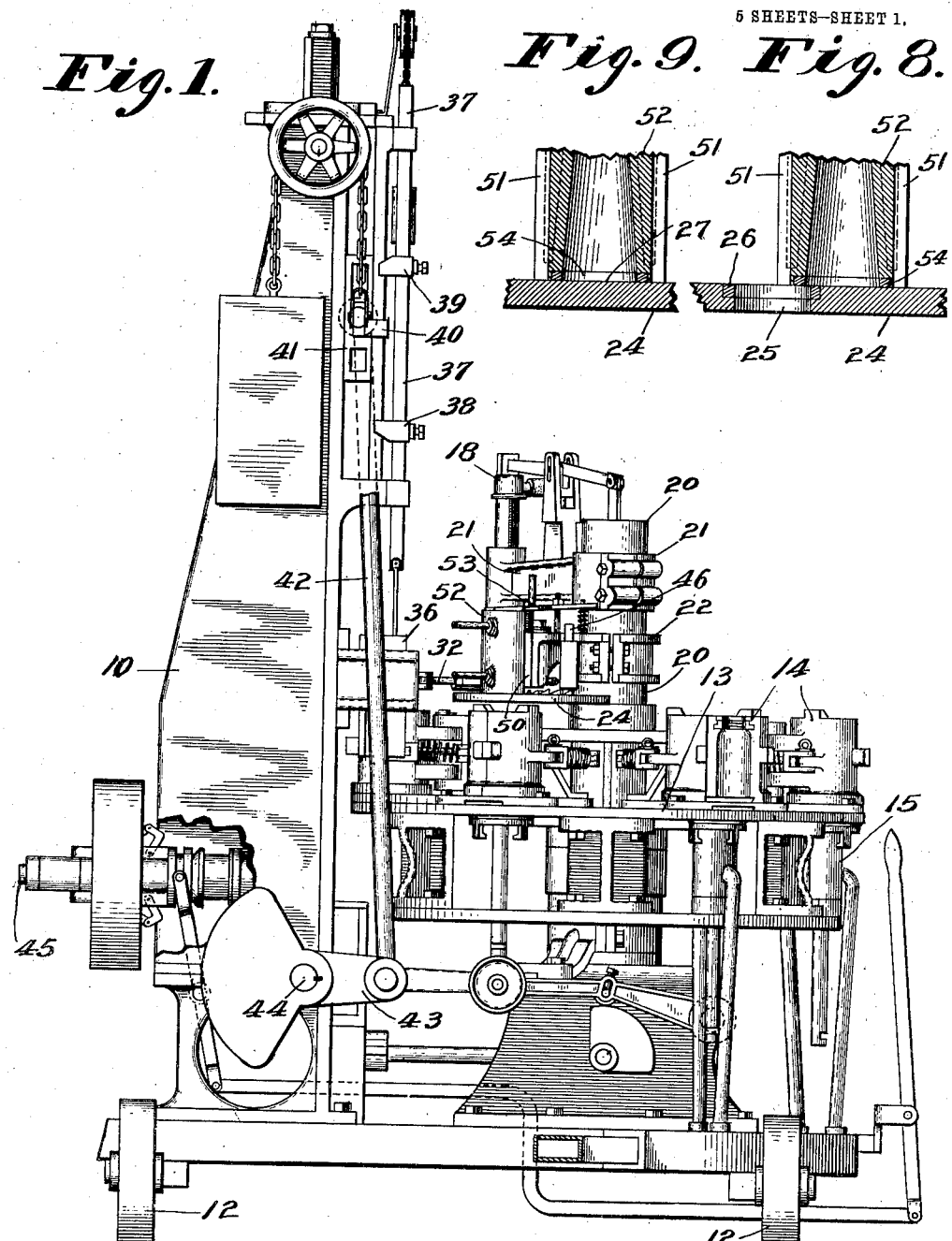
Figure 2:
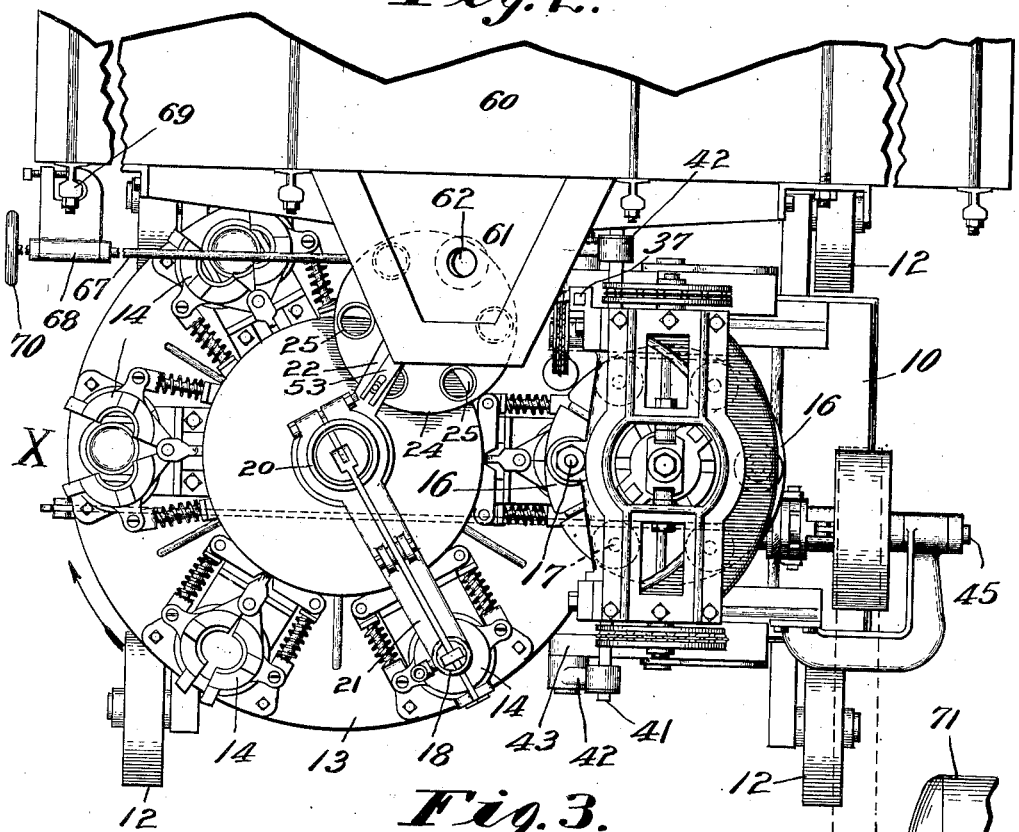
Figure 3:
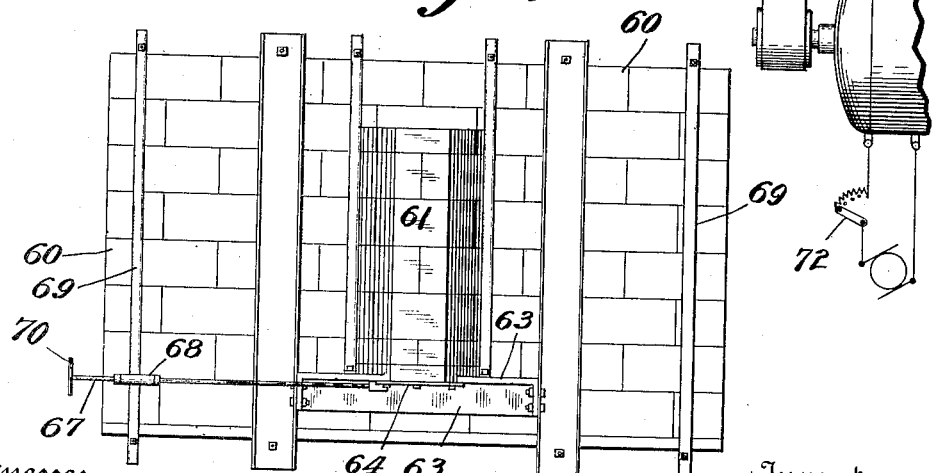
Figure 6:
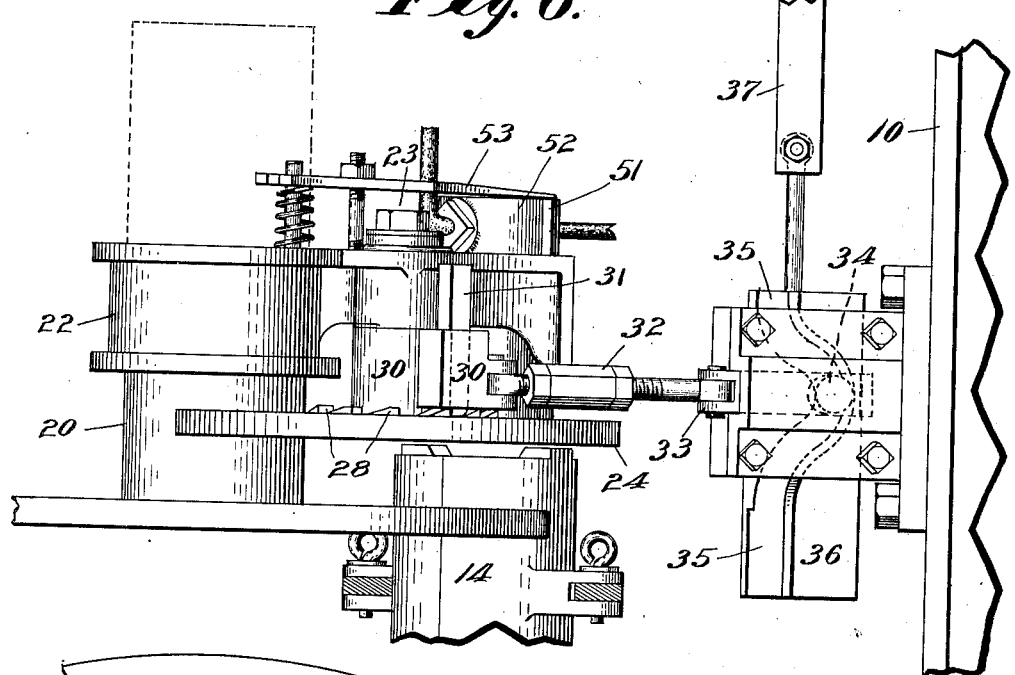
Figure 7:
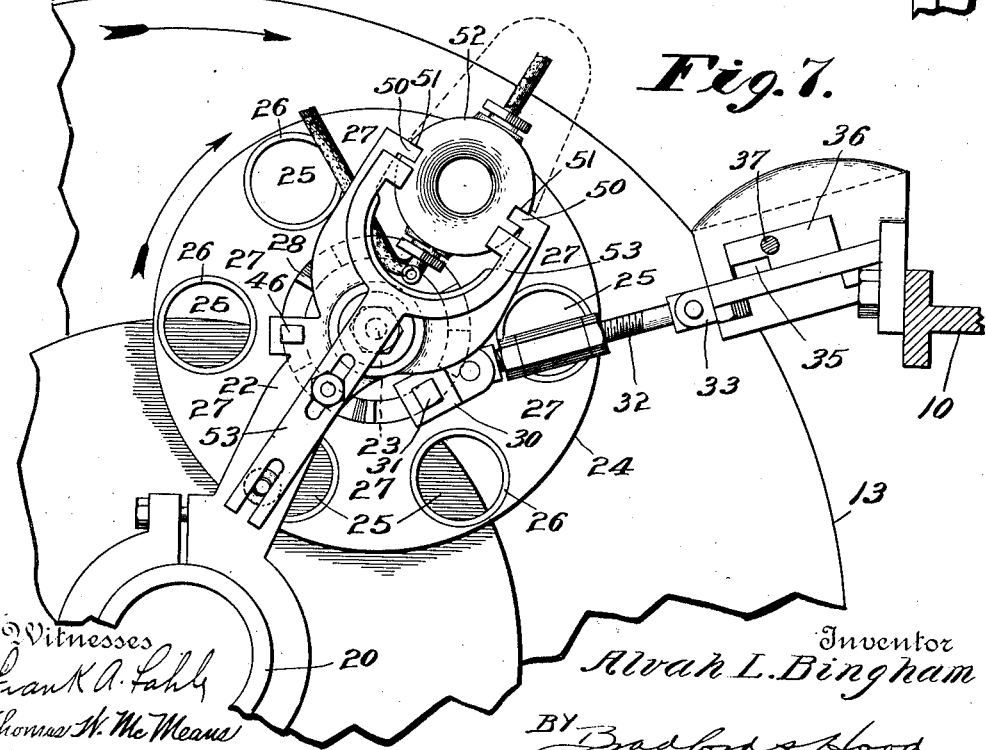

The accompanying drawings illustrate my invention as adapted for and applied to an automatic blowing machine, such as is shown in Patent 817,745 issued April 17, 1906. Figure 1 is a side elevation of such a machine equipped with the interrupter portion of my device; Fig. 2 a plan of said machine and a furnace of proper form to deliver thereto; Fig. 3 a front elevation of the furnace; Fig. 4 a vertical section, on an enlarged scale, of the interrupter, the adjacent delivering portion of the melting furnace and a portion of a press mold in receiving position; Fig. 5 an under plan of the adjustable delivery port of the furnace; Fig. 6 an elevation of the interrupter, its operating mechanism, and a receiving mold in receiving relation therewith, the cut-off disk and operating mechanism therefor being shown in position immediately prior to a cut-off actuation of the cut-off disk; Fig. 7 a plan of the parts shown in Fig. 6; Fig. 8 a sectional detail showing the cut-off disk advancing through severing position to interrupting position; Fig. 9 a similar detail showing the cut-off plate in interrupting position; Fig. 10 a vertical sectional detail of a modified form of delivery structure for the melting furnace, the interrupter and receiving press mold being also shown in vertical section; Fig. 11 a front elevation, on a smaller scale, of those parts of Fig. 10 which illustrate the modified delivery structure.

In the drawings I have shown, without much detail, an automatic blowing machine of the type illustrated in my patent above mentioned, but it will be understood that my invention may be readily applied to many different forms of glass-blowing or glass-molding machines either partially or entirely automatic in their operation.

In the drawings, 10 indicates the main frame of a blowing machine supported upon suitable carrying wheels 12 so that it can be readily shifted into and out of coöperative relation with the furnace.

The machine illustrated comprises a horizontally rotatable table 13 carrying a plurality of blow molds 14 adapted, in the illustrated construction, to be automatically opened and closed and adapted to coöperate with a corresponding plurality of press molds 15 automatically shifted into and out of coöperative relation. Coöperating with the blow molds and contained press molds is a presser head 16 carrying a plurality of press plungers 17. Also coöperating with the press molds in succession, subsequent to the withdrawal of the press mold and operation of the press head, is a blow head 18. The press head (except the cross-head) has been omitted from Fig. 1 for the sake of clearness of illustration of the present invention.

In the illustrated machine the table 13 is rotatably journaled upon a central standard 20 upon which the blow arm 21 is secured, and for convenience I have mounted the major portion of my present device, *i. e.*, the interrupter, upon said standard. Said interrupter is carried by an arm 22 clamped upon standard 20 in order that the parts supported thereby may be brought into coöperative relation with the receiving molds 14—15. Journaled in arm 22 is a shaft 23 which carries upon its lower end a cut-off disk or plate 24 which, in the present instance, is provided with six openings or perforations 25 each of which at its upper end is provided with a cut-off ring 26. The openings 25 are separated by an amount substantially equal to their diameters so as to form a series of glass supporting portions 27, the purpose of which will appear. Secured to, or formed integral with disk 24, is an annular series of ratchet teeth 28 which are preferably equal in number to double the number of openings 25. Journaled upon arm 22, concentric with shaft 23 and the annular series of teeth 28, is an arm 30 carrying a pawl 31 adapted to engage teeth 28. Pivoted to the outer end of arm 30 is one end of a link 32, the opposite end being pivoted to a slide 33 having a pin 34 (shown in dotted lines in Fig. 6) which lies within a cam slot 35 carried by a reciprocating cam plate 36. Plate 36 is connected to a sliding rod 37 provided with a pair of adjustable strikes 38 and 39 extended into the path of movement of a finger 40 carried by the cross head 41 of the plunger head 16. Cross head 41 is reciprocated by means of pitman 42 connected to crank arms 43 of a shaft 44 driven in any suitable manner from the main drive shaft 45. Arm 22 carries a pawl 46 adapted to engage the ratchet teeth 28 and prevent reverse rotation of the disk 24.

The outer end of arm 22 is bifurcated and the ends are provided with a pair of inwardly projecting fingers 50, 50 which take into longitudinal slots 51, 51 formed in the opposite sides of an open-ended guard 52. The guard 52 is open from end to end vertically and rests upon the upper face of disk 24, being held down upon said disk by a spring plate 53, the container being free to reciprocate vertically on fingers 50 and thus maintaining a close fit to prevent glass getting between the disk and guard. At the lower end of the central bore of guard 52 I provide a cut-off ring 54 to coöperate with cut-off rings 26 of disk 24, and the guard is so arranged upon arm 22 that openings 25 of disk 24 may be successively brought into register with the bore of the guard, so as to afford a clear passage through the guard and the disk into the receiving press mold 14, 15 the portions 27 of disk 24 being brought successively beneath the bore of the guard, so as to intermittently close the bottom thereof. In view of the fact that molten glass sticks tightly to iron when the iron is too hot, it is advisable to cool the guard, and for that purpose I surround the central bore with a cooling chamber 55 provided with suitable outlet and inlet pipes.

Table 13 is, of course, rotated step by step so as to bring the several molds successively into position beneath guard 52 so as to receive the direct stream of glass through the guard.

Any suitable means may be provided to cause a continuous stream of molten glass to flow through the guard 52 but I prefer the arrangement shown in Figs. 2 to 5 inclusive. In this arrangement the furnace 60 is elevated above the floor which supports the machine and is provided with an overhanging delivery chamber 61 through the bottom of which is formed a delivery passage 62, said passage continuing downward through the supporting plate 63. Slidably mounted in suitable guideways 64 on the bottom of plate 63 is a valve plate 65 provided with a notched end 66 adapted to coöperate with the discharge passage 62 so that the effective area of discharge opening from the furnace may be conveniently adjusted in size. The valve plate 65 may be adjusted by any suitable means but a satisfactory means is that shown in Fig. 5 wherein the valve plate is carried on the threaded end of a rotary shaft 67 journaled in the bracket 68 adapted to be readily attached to one of the supporting bars 69 of the furnace 60, and provided at its outer end with an operating wheel 70. Any suitable means may be used to drive the forming machine but it is desirable that a driving means be provided which can be readily controlled as to its speed, and for this purpose a convenient means comprises an electric motor 71 having a rheostat 72 in its controlling circuit.

The operation is as follows: When the glass in the furnace has reached a proper state of fluidity, valve 65 is opened and a stream of glass permitted to flow continuously from the furnace, this stream approximating the size to deliver the desired quantity. The machine is then rolled into position where the guard 52 lies immediately beneath the discharge opening of the furnace so that the stream of molten glass may pass therethrough freely so long as an opening 25 of plate 24 is in register with said guard, and the stream of glass passes down through the guard into a press-mold 15 in receiving position therebeneath. The quantity of molten glass which is allowed to pass into a press-mold is readily adjusted by an adjustment of the valve plate 65, or an adjustment of the speed of the motor and consequent speed of the machine, or a combined adjustment of the two, the quantity of glass flowing into a given mold being dependent upon the size of the outlet, the fluidity of the glass, and the speed of operation of the machine. By the time a desired quantity of glass has passed into the mold, shaft 44 has been turned to a position where finger 40 has come into engagement with strike 39 so as to shift cam plate 36 from its lowest position through the position shown in Fig. 6 to its upper position, thereby turning plate 24 (in the form shown in the drawings) through one-twelfth of a rotation so as to drive disk 24 from a position where one of openings 25 was in register with the bore of guard 52 through the position shown in Fig. 8 to the position shown in Fig. 9, the coöperating rings 26 and 54 serving to sever the stream of molten glass. Table 13 is then shifted so as to bring the recently filled press-mold into alinement with one of the plungers of the press-head 16 so that when said plunger descends there will be a pressing operation on the molten glass in the press-mold. When said plunger descends finger 40 will be brought into engagement with strike 38 and thus cause a downward movement of cam plate 36. While this movement is taking place there is a short period when one of the spaces 27 of disk 24 closes the lower end of the guard 52 and the continually flowing stream of molten glass from the furnace therefore piles up upon this portion of the disk 24, but this is a comparatively short portion of the time and as soon as cam plate 36 is moved downwardly another complete reciprocation of the ratchet arm 30 is produced and plate 24 is advanced through another one-twelfth of a revolution so as to bring a new opening 25 of said plate into register with the guard and at the same time a new press-mold has been brought into receiving position so that the molten glass drops into said press-mold and continues to flow thereinto until the next upward movement of cam plate 36, whereupon the operation is repeated. The length of time when the stream of glass is flowing upon and being arrested by the disk 24 is comparatively short and the glass which comes into contact with said disk is only a small portion of the entire quantity which passes into the mold and consequently this small portion, although slightly cooled by its contact with disk 24 and perhaps the walls of the guard, becomes reheated by the comparatively large additional quantity of fresh hot glass which flows directly through the guard and enters the mold without preliminary contact with anything. As a consequence, it is possible to get the glass into the mold in the very best possible condition.

In the modification shown in Figs. 10 and 11, the furnace 80 is provided with an outlet passage 81 in its side, said outlet passage continuing through a face plate 82. Mounted outside of the face plate 82 is a valve plate 83 having a passage 84 adapted to be brought more or less into register with the passage 81 in plate 82, and also provided with a delivery spout 85. Plate 84 may be shifted by means of a screw 86. The passage 81 being substantially horizontal, the molten glass would flow from spout 85 in a curved path and, in order to control the movement I arrange adjacent the normal path of flow, a deflector plate 87 hinged at its upper end to brackets 88 and provided with an operating lever 89. The deflector plate 87 may be provided with a cooling chamber 90, if desired. In the operation of this form, the machine may be a substantially stationary one and the guard 52 arranged in the normal flow line, the deflector plate 86 being used more or less, or preferably not at all, in the normal operation of the machine. If for any reason, however, it be desired to stop the flow into the machine temporarily, the deflector plate 87 can be swung to the position shown in dotted lines in Fig. 10, so as to thus deflect the stream away from the guard and allow the glass to flow to a waste pot or receiver.

In operation the action of the machine is automatic in all respects except the withdrawal of the completed articles, and therefore but one operator is necessary, this operator controlling the outflow of glass from the furnace, the speed of the machine, and withdrawing the finished product when the molds reach the point "X", Fig. 2, where they are automatically opened to permit such withdrawal.

I am aware that it has heretofore been proposed, notably in Patent 836,287, to Brookfield, to deliver molten glass from the furnace in a continuous stream, and after separating said stream into successive portions, to deliver said portions to press molds, but in that device the stream of glass is delivered into a temporary receiver or measuring vessel and separated into desired portions and subsequently delivered from said measuring receptacle to successive press-molds. In such construction the measuring vessel must necessarily be kept fairly cool, as otherwise the glass will stick to it, and when the measuring vessel is kept sufficiently cool the entire portion of glass to be subsequently operated upon in the press mold is subjected to the cooling influence of the measuring vessel, and I therefore do not claim such a construction. In my present construction, however, a very considerable proportion of the glass which enters in any particular mold streams directly from the furnace into the mold and is not touched at all by anything before its deposit in the mold.

I claim as my invention:

1. In a glass machine, the combination, of a plurality of receiving molds, an open-ended guard adapted to be arranged in the line of flow of a stream from a glass furnace but independent of said furnace, means for bringing the molds successively beneath said guard whereby the glass stream may flow therethrough into a mold, and means independent of the molds for intermittently severing the glass stream as it passes through said guard.

2. In a glass machine, the combination, of a plurality of receiving molds, an open-ended guard adapted to be arranged in the line of flow of a smaller stream from a glass furnace, means for bringing the molds successively beneath said guard whereby the glass stream may flow therethrough into a mold, and means independent of the molds for intermittently closing the lower end of said guard and serving the glass stream.

3. In a glass machine, the combination, of a plurality of receiving molds, an open-ended guard adapted to be arranged in the line of flow of a stream from a glass furnace, means for bringing the molds successively beneath said guard whereby the glass stream may flow therethrough into a mold, a rotary plate arranged beneath said guard and provided with a plurality of spaced openings adapted to register with the lower end of said guard and provided with corresponding portions adapted to close the lower end of said guard, and means for intermittently rotating said plate step-by-step in synchronism with the means for bringing the molds into successive receiving position to alternately open and close the lower end of said guard and intermittently sever the flowing glass stream.

4. The combination with a glass furnace having means for discharging a comparatively small stream of molten glass in condition for pressing or blowing operations, of a movable mold carrier, a plurality of molds thereon and arranged to be brought successively into position to directly receive the stream of molten glass, and a cut-off device arranged between the furnace outlet and the molds and separated from both, said cut-off device comprising a guard through which the glass stream normally flows without filling the same transversely, and a shearer coöperating with the said guard to intermittently sever the glass stream.

5. In a glass handling machine, the combination of a rotary mold carrying table, a plurality of molds carried thereby, a cut off plate arranged above the plane of the molds, means for intermittently moving said cut off plate, an open-ended guard resting upon said cut off plate and coöperating therewith, means for yieldingly urging said guard down upon the plate, and means for holding said guard against movement with the plate.

6. The combination with a glass furnace having adjustable means for discharging a comparatively small stream of molten glass in condition for pressing or blowing operations, of a movable mold carrier, a plurality of molds thereon and arranged to be brought successively into position to directly receive the stream of molten glass, and a cut-off device arranged between the furnace outlet and the molds and separated from both, said cut-off device comprising a guard through which the glass stream normally flows without filling the same transversely, and a shearer coöperating with the lower end of said guard to intermittently sever the glass stream and form a temporary retainer for the oncoming end of the stream within the guard.

7. In a glass handling machine, the combination of a rotary mold carrying table, a plurality of molds carried thereby, a rotary cutoff plate arranged above the plane of the molds and provided with a plurality of perforations and intermediate spaces, means intermittently moving said cut off plate, an open-ended guard resting upon said cut off plate and coöperating therewith, means for yieldingly urging said guard down upon the plate, and means for holding said guard against movement with the plate.

8. In a glass handling mechanism, the combination of a rotary mold carrying table, a furnace arranged to deliver a depending stream of glass directly into the molds of the mold table, means for rotating the mold carrying table to bring the molds successively into glass receiving position, an arm arranged above the table, a shear member movably mounted upon said arm, a vertical tubular guard mounted upon said shear member and arranged in vertical alinement with the receiving position of the molds and in position to permit the depending glass stream to flow therethrough, and vertically-yielding laterally-restraining interlocking members carried by the arm and the tubular guard.

9. In a glass handling mechanism, the combination of a rotary mold carrying table, a furnace arranged to deliver a depending stream of glass directly into the molds of the mold table, means for rotating the mold carrying table to bring the molds successively into glass receiving position, an arm arranged above the table, a horizontally-disposed rotary multi-perforated shear member movably mounted upon said arm, a vertical tubular guard mounted upon said shear member in vertical alinement with the receiving position of the molds and in position to permit the depending glass stream to flow therethrough and to intermittently register with the perforations of the shear member, and vertically-yielding laterally-restraining interlocking members carried by the arm and the tubular guard.

In witness whereof, I have hereunto set my hand and seal at Muncie, Indiana, this 27th day of November, A. D. one thousand nine hundred and seven.

ALVAH L. BINGHAM. [L. S.]

Witnesses:
MORRIS L. HAGEMAN,
F. C. BELL.